March 6, 1928.

C. P. EISENHAUER 1,661,886

PUMP

Filed March 2, 1927

INVENTOR.
CHARLES P. EISENHAUER,
BY Toulmin & Toulmin
ATTORNEYS.

Patented Mar. 6, 1928.

1,661,886

UNITED STATES PATENT OFFICE.

CHARLES P. EISENHAUER, OF DAYTON, OHIO, ASSIGNOR TO THE DURO COMPANY, OF DAYTON, OHIO, A CORPORATION OF OHIO.

PUMP.

Application filed March 2, 1927. Serial No. 171,942.

My invention relates to pumps and in particular to valves for pumps.

It is the object of my invention to provide a valve in a pump which will absorb the shock of delivery of the fluid particularly when the direction of the piston is reversed and the compression of the liquid impedes the movement of the piston.

In high speed pumps, this is especially advantageous in that the hammering and jarring, which is not only audible and disagreeable but injurious to the mechanism, can be thus eliminated.

It is a further object to provide a non-corrosive, self-contained valve mechanism which is absolutely noiseless, and which permits of a large area for the quick exit of fluid especially necessary in connection with high speed pumps.

Referring to the drawings.

Figure 1:
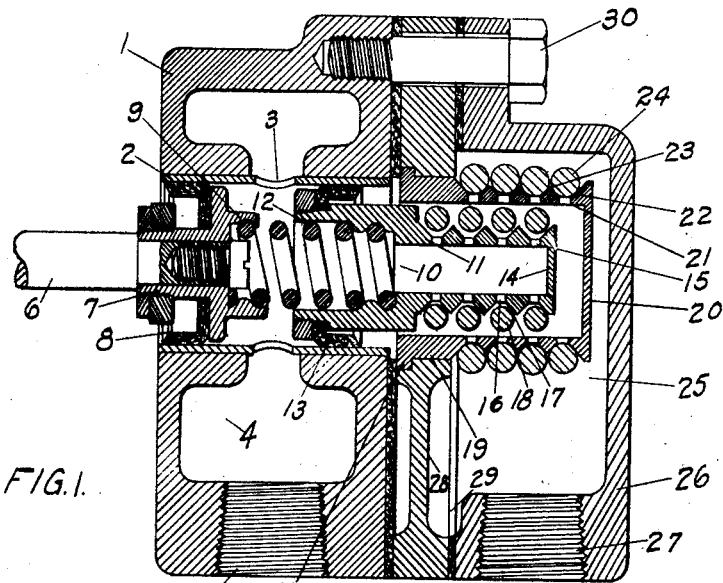
Figure 1 is a section through a cylinder, piston and valve mechanism with the pumping mechanism in position for drawing a charge of water into the cylinder.
Figure 2:
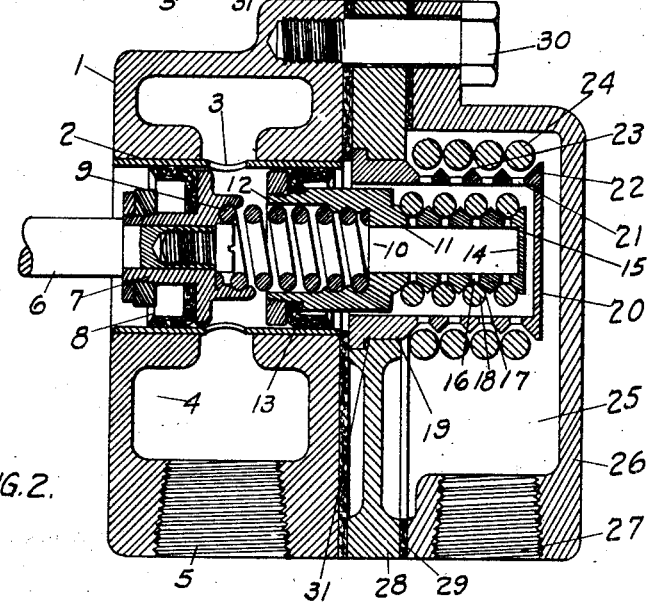
Figure 2 is a similar view with the mechanism in position of discharging the volume of water.

Referring to the drawings in detail, 1 is a cylinder and intake port housing containing a cylinder liner 2, which is provided with inlet ports 3 from the inlet chamber 4 in the housing 1, which inlet chamber is fed through an opening 5 with liquid from any desired source.

6 designates a piston rod on which is mounted a piston 7 having a washer 8. This piston supports on its end opposite to that from which projects the piston rod a relatively heavy shock absorbing helical spring 9 adapted to normally have spaces between the coils for the entrance of the incoming liquid into the center of the spring into the chamber 10 within the cylinder 11. This cylinder 11 is formed with a skirt 12, the interior of which is connected to the spring 9. The exterior of the skirt is provided with a washer 13 so that in effect the cylinder 11 and skirt 12 becomes a supplementary piston yieldingly connected by the spring 9 to the piston 7. The end of the sleeve 11 is closed as at 14. The sleeve itself is provided with a plurality of radial apertures 15 arranged at intervals in a series of openings on all sides of the sleeve. The exit ends of these openings will be found as at 16 in the bottoms of grooves formed by tapered projecting shoulders 17 on the exterior of the sleeve, such tapered surfaces of such shoulders constituting valve seats for rubber rings 18 which are preferably circular in section.

The sleeve 11 and the supplementary piston or skirt 12 are adapted to move within a larger cylinder 19 spaced therefrom on the exterior thereof and also having a closed end, 20. This cylinder is provided with a similar series of radial apertures, such as the apertures 21, the outer ends of which open into the depressed space between the tapered shoulders 22 formed by ridges 23 having such tapered shoulders.

Between these shoulders are mounted the elastic valve rings 24 adapted to seal the openings normally. The last mentioned cylinder 19 is located within an exit chamber 25 formed in the casing 26 which is connected to an exit passageway 27. The cylinder is supported in a ring 28 between the exit casing 26 and the inlet casing 1. Suitable washers 29 seal the parts together, while bolts, such as 30, hold the parts in fixed engagement with one another. The cylinder 19 is provided with an annular shoulder 31 which is engaged between the ring 28 and the casing 1 on the one hand while the ring 28 is engaged between the casing 26 and the casing 1.

*Method of operation.*

When the piston rod 6 moves to the left hand water will have already entered through the coils of the spring 9 into the interior of the spring and in the chamber 10 of the piston head 11. As the speed of the piston moves to the left hand it is greater than the movement of the water and, therefore, the water is compressed within the hollow piston 11 in the chamber 10 and, due to the further fact that a vacuum or suction is set up within the cylinder head 19, the water is caused to flow through the port 16 lifting the rings 18 so that the water within the piston is delivered within the cylinder head 19.

Upon the return of the piston and piston rod towards the right hand the water within the cylinder head 19 is compressed between the piston 11 and the rings 18 which are now seated so that the water is ejected from the piston head 19 through the ports 21 lifting the rings 24 discharging the water into the casing 26, which forms the discharge chamber 25.

The shock of this discharge and sudden compression is absorbed by the yielding nature of the connection between this portion of the piston which is stationary on the piston rod designated 7 and the portion of the piston which is movable relative thereto designated 11.

It will be understood that I desire to comprehend within my invention such modifications as may be necessary to adapt it to carrying conditions and uses.

Having thus fully described my invention what I claim is new and desire to secure by Letters Patent, is:—

1. In combination, a cylinder having an inlet port and a plurality of radial ports, a sealing ring mounted on the exterior of said cylinder over said ports adapted to regulate the exit of liquid from the interior of the cylinder to the exterior thereof, said cylinder having an annular groove on the exterior thereof associated with the exit ends of said ports for forming a seating surface for said ring to facilitate the sealing of said ports, and a second cylinder having a plurality of radial ports and telescoping within the said cylinder, the two cylinders being relatively movable with respect to each other.

2. In combination, a cylinder having a plurality of exit ports, a resilient sealing ring mounted on the exterior of said cylinder adapted to seal said ports, a second cylinder adapted to telescope within the first cylinder likewise having a series of radial ports and a resilient sealing ring for sealing said ports, and means to reciprocate said cylinders relative to one another whereby liquid may enter through the second cylinder lifting the resilient sealing ring and entering the first cylinder upon the movement of the interior cylinder in one direction and be forced out of the ports in the first cylinder lifting the sealing ring thereon upon the movement of the second cylinder in the first direction.

3. In combination in a pump of a pump cylinder having an inlet port, a piston, a piston rod, a moving cylinder connected to said piston adapted to permit the entering liquid in the cylinder to enter therein, said moving cylinder having a plurality of radial ports and a resilient sealing ring mounted on the exterior of the cylinder for sealing said ports, whereby as the liquid is compressed within said moving cylinder as it moves with the piston the liquid will make its exit by lifting said resilient sealing ring.

4. In combination in a pump of a pump cylinder having an inlet port, a piston, a piston rod, a moving cylinder connected to said piston adapted to permit the entering liquid in the cylinder to enter therein, said moving cylinder having a plurality of radial ports and a resilient sealing ring mounted on the exterior of the cylinder for sealing said ports, whereby as the liquid is compressed within said moving cylinder as it moves with the piston the liquid will make its exit by lifting said resilient sealing ring, and a second stationary cylinder within which the moving cylinder is adapted to telescope, said second stationary cylinder having a plurality of radially-disposed ports, and a resilient sealing ring adapted to close said ports on the exterior thereof.

5. In combination in a pump of a pump cylinder having an inlet port, a piston, a piston rod, a moving cylinder connected to said piston adapted to permit the entering liquid in the cylinder to enter therein, said moving cylinder having a plurality of radial ports and a resilient sealing ring mounted on the exterior of the cylinder for sealing said ports, whereby as the liquid is compressed within said moving cylinder as it moves with the piston the liquid will make its exit by lifting said resilient sealing ring, and a second stationary cylinder within which the moving cylinder is adapted to telescope, said second stationary cylinder having a plurality of radially-disposed ports, and a resilient sealing ring adapted to close said ports on the exterior thereof, said moving cylinder and said second stationary cylinder each having a groove adjacent said ports serving as a valve seat for each of the resilient sealing rings.

6. In combination in a pump of a pump cylinder having an inlet port, a piston, a piston rod, a moving cylinder connected to said piston adapted to permit the entering liquid in the cylinder to enter therein, said moving cylinder having a plurality of radial ports and a resilient sealing ring mounted on the exterior of the cylinder for sealing said ports, whereby as the liquid is compressed within said moving cylinder as it moves with the piston the liquid will make its exit by lifting said resilient sealing ring, and a second stationary cylinder within which the moving cylinder is adapted to telescope, said second stationary cylinder having a plurality of radially-disposed ports, and a resilient sealing ring adapted to close said ports on the exterior thereof, said moving cylinder and said second stationary cylinder each having a groove adjacent said ports serving as a valve seat for each of the resilient sealing rings, and a resilient connection between said piston and said moving cylinder so arranged as to permit the entrance of fluid into the moving cylinder and to absorb the shock of compression by the moving cylinder of the liquid in the second stationary cylinder.

7. In combination, a cylinder having an inlet port, a piston, a piston rod, a hollow cylinder having a plurality of radial ports, the said hollow cylinder being adapted to reciprocate with the piston within the stationary cylinder first mentioned, and yielding means connecting said piston and cylinder, whereby the shock of the compression by the moving cylinder will be absorbed by the yielding connection between said piston and moving cylinder.

8. In combination, a cylinder having an entrance port, a piston, a piston rod, a moving cylinder having means to seal its exterior wall with the stationary cylinder, a helical spring connecting said piston and moving cylinder, and valve means on said moving cylinder for permitting the exit of fluid therefrom.

9. In combination, a cylinder having an entrance port, a piston, a piston rod, a moving cylinder having means to seal its exterior wall with the stationary cylinder, a helical spring connecting said piston and moving cylinder, and valve means on said moving cylinder for permitting the exit of fluid therefrom, said valve means consisting of a resilient sealing ring mounted on the exterior of said moving cylinder adapted to seal a plurality of apertures to the wall of said cylinder.

10. In combination, a cylinder having an entrance port, a piston, a piston rod, a moving cylinder having means to seal its exterior wall with the stationary cylinder, a helical spring connecting said piston and moving cylinder, and valve means on said moving cylinder for permitting the exit of fluid therefrom, said valve means consisting of a resilient sealing ring mounted on the exterior of said moving cylinder adapted to seal a plurality of apertures to the wall of said cylinder, and a stationary cylinder adapted to receive telescopically the moving cylinder and having a plurality of radial apertures and a sealing ring adapted to seal such apertures to control the exit of fluid therethrough.

11. In combination, a casing having an inlet chamber and a cylinder communicating therewith, a piston and piston rod reciprocating in said cylinder, a helical spring adapted to connect said piston, and a moving cylinder, a washer on said moving cylinder engaging with the interior of the stationary cylinder, a plurality of resilient rings mounted in grooves on the exterior of the moving cylinder, said moving cylinder having a plurality of apertures communicating with said grooves, a second stationary cylinder adapted to receive telescopically said moving cylinder, said second cylinder having a plurality of resilient sealing rings mounted in grooves over exit apertures therein, and a casing for an exit chamber surrounding said second stationary cylinder for receiving liquid ejected from the second stationary cylinder.

In testimony whereof, I affix my signature.

CHARLES P. EISENHAUER.